United States Patent [19]

Lo

[11] 4,061,293
[45] Dec. 6, 1977

[54] BALLOON WITH MANUALLY OPERABLE HELICOPTER BLADES

[75] Inventor: Kenneth K. Lo, Richmond, Canada

[73] Assignee: The Raymond Lee Organization, Inc., New York, N.Y. ; a part interest

[21] Appl. No.: 775,709

[22] Filed: Mar. 9, 1977

[51] Int. Cl.² ............................................. B64B 1/32
[52] U.S. Cl. ...................................... 244/26; 244/64
[58] Field of Search .................. 244/5, 26, 29, 64, 69, 244/23 C, 2, 12.2, 30, 31, 67, 17.11; D12/71, 73, 74

[56] References Cited

U.S. PATENT DOCUMENTS

| 688,584 | 12/1901 | Botts | 244/26 |
| 2,704,192 | 3/1955 | Paul | 244/26 |

*Primary Examiner*—Barry L. Kelmachter
*Attorney, Agent, or Firm*—Daniel Jay Tick

[57] ABSTRACT

A balloon filled with buoyant gas provides the major part of the required lift. A pair of spaced rings are supported by a rigging having a plurality of lines supported by the upper half of the balloon at approximately the vertical center of the balloon. Each of a pair of helicopter blade units is rotatably mounted on a corresponding one of the rings. A frame is supported by the rigging beneath the balloon and has a passenger's bicycle type seat mounted thereon, a pedal-operated sprocket wheel rotatably mounted thereon and a plurality of landing wheels rotatably mounted thereon. The sprocket wheel is coupled to the helicopter blade units in a manner whereby a passenger seated in the seat and pedalling the sprocket wheel in any position between central and forward positions contrarotates the torque-balancing blade units for providing additional lift and forward propulsion force. A rudder is movably mounted on the frame and is controlled in direction by the passenger for directing the aircraft in flight.

2 Claims, 15 Drawing Figures

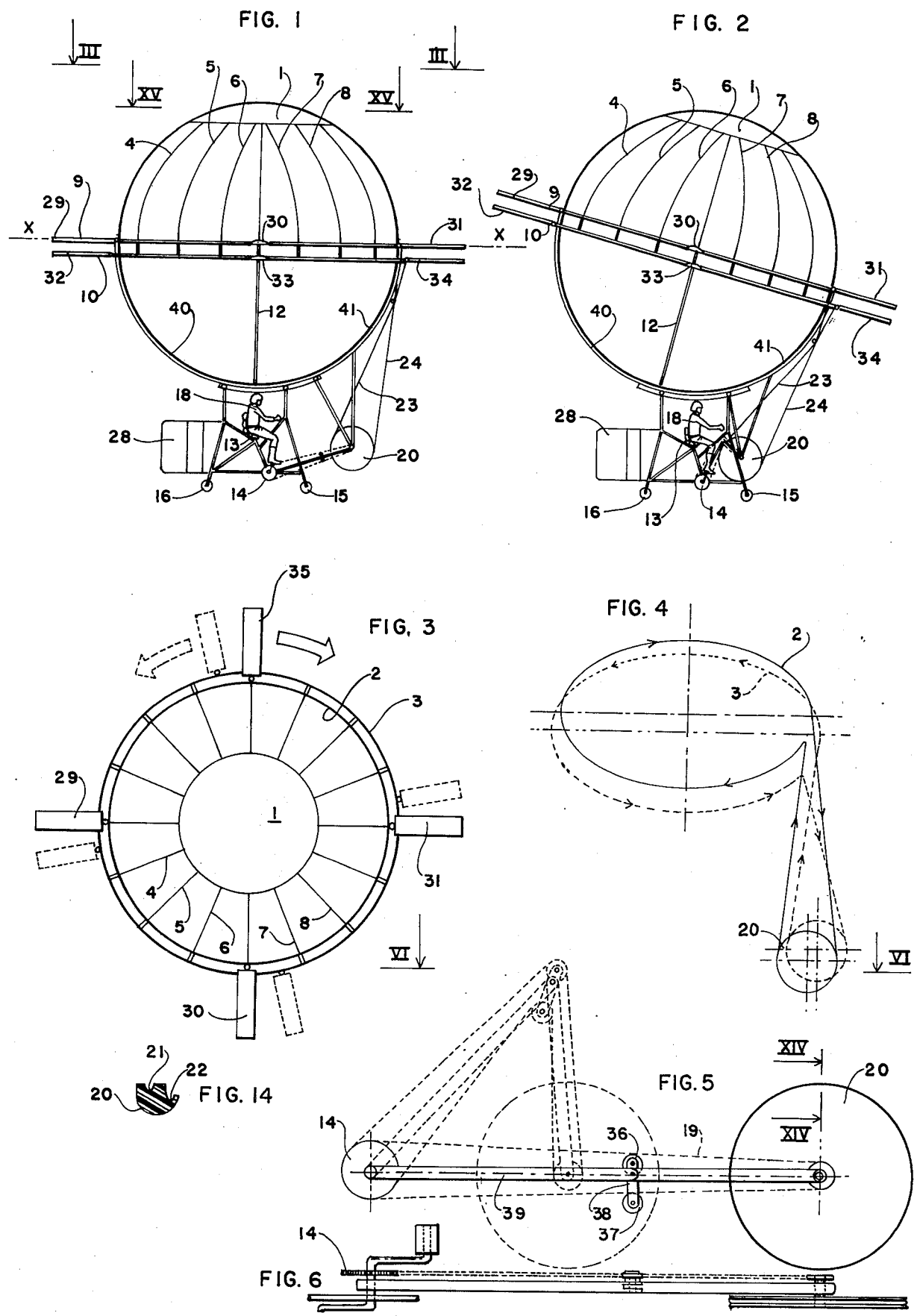

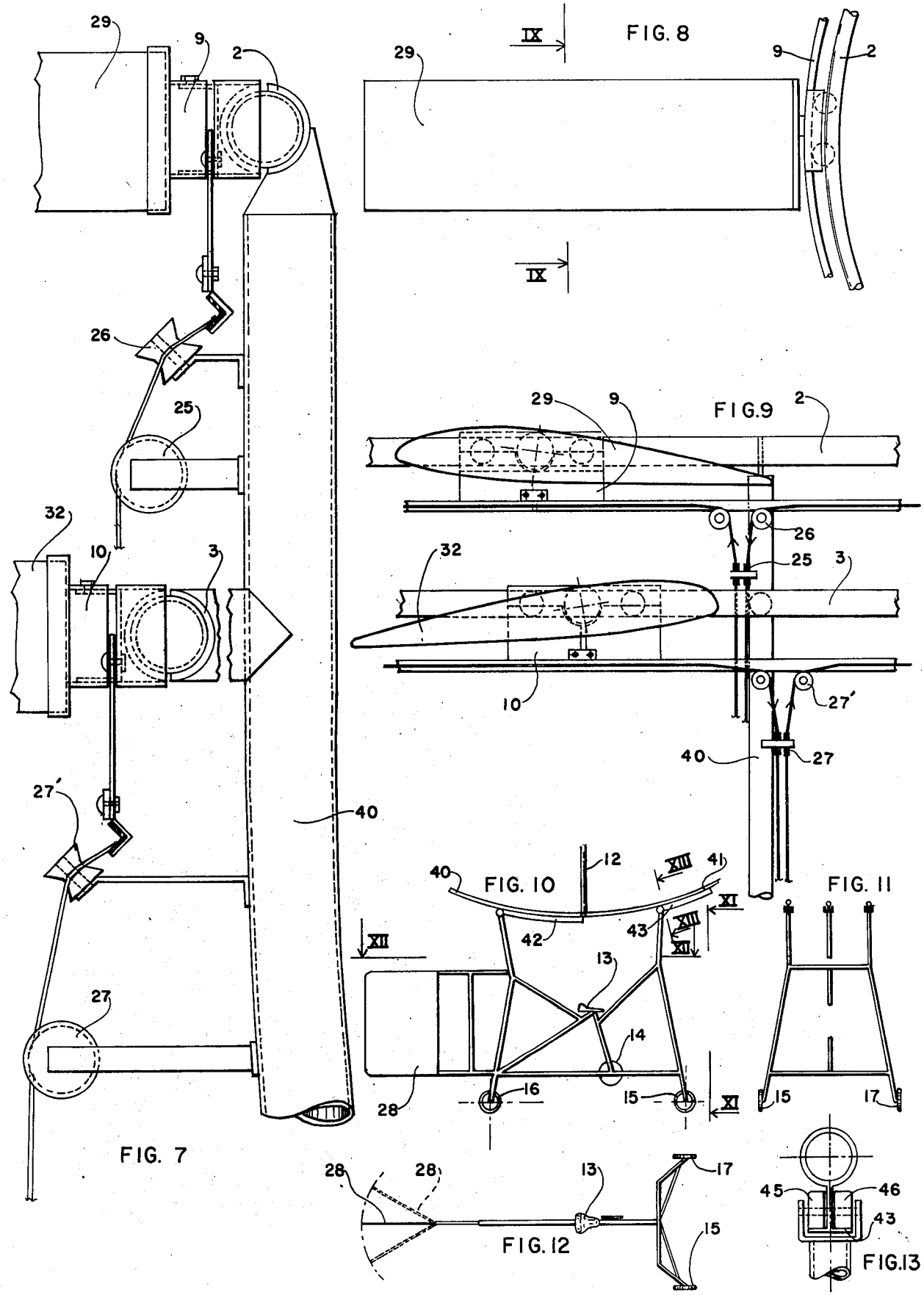

BALLOON WITH MANUALLY OPERABLE HELICOPTER BLADES

BACKGROUND OF THE INVENTION

The present invention relates to an aircraft.

Objects of the invention are to provide an aircraft of simple structure, which is inexpensive in manufacture, buoyed by gas and propelled and directed by the energies of a passenger, completely free of pollution, capable of descending to and ascending from a point on the ground, storable in a minimum space, and efficient, effective and reliable in operation, at relatively low altitudes, as a convenient air conveyance.

BRIEF DESCRIPTION OF THE DRAWINGS

In order that the invention may be readily carried into effect, it will now be described with reference to the accompanying drawings, wherein:

FIG. 1 is a side view of an embodiment of the aircraft of the invention with the operator-passenger at a central position for vertical ascent or descent flights;

FIG. 2 is a side view of the embodiment of FIG. 1 with the operator-passenger at a forward position for forward flights including ascents or descents;

FIG. 3 is a view, taken along the lines III—III, of FIG. 1;

FIG. 4 is a schematic diagram illustrating part of the linkage to the helicopter blade units of the aircraft of the invention;

FIG. 5 is a schematic diagram of an embodiment of the propulsion system foldable linkage of the aircraft of the invention;

FIG. 6 is a view, taken along the lines VI—VI, of FIG. 5;

FIG. 7 is a view, on an enlarged scale, of an embodiment of part of the linkage to the helicopter blade units of the aircraft of the invention;

FIG. 8 is a view, on an enlarged scale, of a blade of a helicopter blade unit of the aircraft of the invention;

FIG. 9 is a cross-sectional view, taken along the lines IX—IX, of FIG. 8;

FIG. 10 is a side view of an embodiment of the frame of the aircraft of the invention;

FIG. 11 is a view, taken along the lines XI—XI, of FIG. 10;

FIG. 12 is a view, taken along the lines XII—XII, of FIG. 10;

FIG. 13 is a view, taken along the lines XIII—XIII, of FIG. 10;

FIG. 14 is a cross-sectional view, taken along the lines XIV—XIV, of FIG. 5.

DETAILED DESCRIPTION OF THE INVENTION

Figure 15:
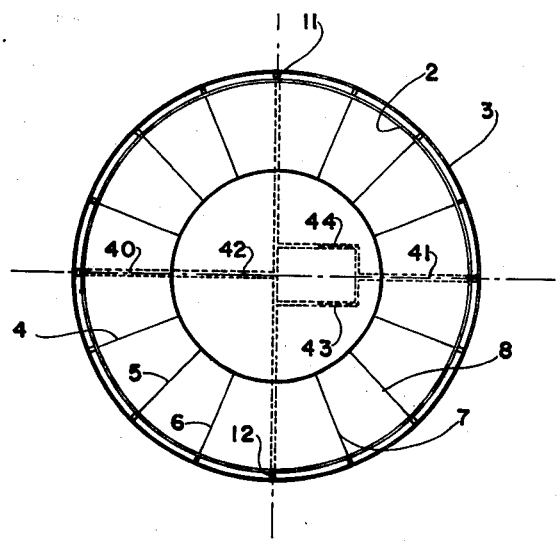
FIG. 15 is a view, taken along the lines XV—XV, of FIG. 1, showing an embodiment of the rigging and part of the frame of the aircraft of the invention.

The aircraft of the invention comprises a balloon 1 (FIGS. 1 to 3) filled with buoyant gas of any suitable type, preferably non-flammable helium, for providing the major part of the required lift.

A pair of spaced rings 2 and 3 (FIGS. 3, 4, 7, 8, 9 and 15) are supported by a rigging having a plurality of lines 4, 5, 6, 7, 8, and so on (FIGS. 1 to 3 and 15) supported by the upper half of the balloon 1 at approximately the vertical center of the balloon.

Helicopter blade units 9 and 10 are rotatably mounted on the rings 2 and 3, as shown in FIGS. 1, 2, 7, 8 and 9.

A frame, shown in FIGS. 1, 2, 5, 6 and 10 to 13, is supported by the rigging 4, 5, 6, 7, 8, and so on, beneath the balloon 1. As shown in FIGS. 1, 2, 10, 11, 13 and 15, the frame is supported from the lines of the rigging via rigid curved posts 11, 12, 40 and 41. The frame is capable of body movement between the central and forward positions. This is accomplished via rollers 45, 46, and so on (FIG. 13), running on rails 42, 43 and 44 (FIGS. 10 and 15). The body movement is controlled by the operator-passenger 18 via any suitable coupling such as, for example, wires and pulleys extending to a control lever.

The frame has an operator-passenger's bicycle type seat 13 (FIGS. 1, 2, 10 and 12) mounted thereon. A pedal-operated sprocket wheel 14 (FIGS. 1, 2, 5, 6, 10 and 12) is rotatably mounted on the frame. A plurality of landing wheels 15, 16 and 17 are rotatably mounted on the frame (FIGS. 1, 2, 10, 11 and 12).

The sprocket wheel 14 is coupled to the helicopter blade units 9 and 10 in a manner whereby an operator-passenger 18 (FIGS. 1 and 2) seated in the seat 13 and pedalling the sprocket wheel in any position between central and forward positions contrarotates the torque-balancing blade units for providing additional lift and forward propulsive force. This is accomplished by a system of sprocket chain, sprocket wheels, pulleys and wires, illustrated in detail in FIGS. 5, 6, 7 and 9, and further explained by the diagram of FIG. 4. The sprocket wheel 14 is coupled, via a sprocket chain 19 guided by sprocket wheels 36 and 37 to a considerably larger diameter second wheel 20, as shown in FIGS. 1, 2, 5 and 6. The sprocket wheels 36 and 37 are rotatably mounted on a bar 38 (FIG. 5). The bar 38 is movably mounted on a foldable linkage 39 (FIG. 5). The broken lines in FIG. 5 show the foldable linkage 39 in folded condition. The second wheel 20, has grooves 21 and 22 formed in its rim, as shown in FIG. 14. Control wires 23 and 24 (FIGS. 1 and 2) couple the second wheel 20 to the helicopter blade units 9 and 10 via additional pulleys 25 and 26 and 27 and 27' and so on (FIGS. 7 and 9).

A rudder 28 (FIGS. 1, 2, 10 and 12) is movably mounted on the frame and is controlled in direction by the operator-passenger 18 by any suitable coupling such as, for example, a pair of wires extending to a control member or stick in the usual manner of an aircraft, for directing the craft in flight.

Each of the helicopter blade units 9 and 10 comprises a plurality of equiangularly spaced blades. The upper ring 9 has a diameter smaller than that of the lower ring 10, as shown in the FIGS. In the illustrated example of the invention, the helicopter blade units 9 and 10 each have four blades. The blades of each helicopter blade unit are positioned from each other 90°. Blades 29, 30 and 31 of the helicopter blade unit 9 and blades 32, 33 and 34 of the helicopter blade unit 10 are shown in FIGS. 1 and 2, whereas FIG. 3 shows all four blades 29, 30, 31 and 35 of the helicopter blade unit 9. Each of the blades of each of the helicopter blade units 9 and 10 is adjustable in pitch before flight for optimum lift, but locked in position during flight.

While the invention has been described by means of a specific example and in a specific embodiment, I do not wish to be limited thereto, for obvious modifications will occur to those skilled in the art without departing from the spirit and scope of the invention.

I claim:

1. An aircraft, comprising a balloon filled with buoyant gas for providing the major part of the required lift;

a pair of spaced rings at approximately the vertical center of the balloon supported by a rigging having a plurality of lines supported by the upper half of the balloon;

a pair of helicopter torque-balancing blade units each unit rotatably mounted on a corresponding one of the rings;

a frame capable of body movement between central and forward positions supported by the rigging beneath the balloon, said frame having a passenger's bicycle type seat mounted thereon, a pedal-operated sprocket wheel rotatably mounted thereon and a plurality of landing wheels rotatably mounted thereon;

coupling means coupling the sprocket wheel to the helicopter blade units in a manner whereby a passenger seated in the seat and pedalling the sprocket wheel in any position between the central and forward positions contrarotates said blade units for providing additional lift and forward propulsive force; and rudder means movably mounted on the frame and controlled in direction by the passenger for directing the craft in flight.

2. An aircraft as claimed in claim 1, wherein each of the helicopter blade units comprises four blades spaced 90° from each other, the upper of the rings having a diameter smaller than that of the lower of the rings.

* * * * *